US00RE46831E

(19) United States
(12) Reissued Patent
Francies, III

(10) Patent Number: US RE46,831 E
(45) Date of Reissued Patent: May 8, 2018

(54) LIFTING AND LEVELING ASSEMBLY FOR PRECAST CONCRETE SLABS AND METHOD

(71) Applicant: Sidney E. Francies, III, Lithia, FL (US)

(72) Inventor: Sidney E. Francies, III, Lithia, FL (US)

(21) Appl. No.: 15/399,338

(22) Filed: Jan. 5, 2017

Related U.S. Patent Documents

Reissue of:
(64) Patent No.: 9,347,232
Issued: May 24, 2016
Appl. No.: 14/595,721
Filed: Jan. 13, 2015

U.S. Applications:
(60) Provisional application No. 61/950,344, filed on Mar. 10, 2014.

(51) Int. Cl.

| | |
|---|---|
| ***E02D 35/00*** | (2006.01) |
| ***E04G 21/14*** | (2006.01) |
| ***E04B 5/04*** | (2006.01) |
| ***E04B 1/35*** | (2006.01) |
| ***B66F 3/08*** | (2006.01) |

(52) U.S. Cl.
CPC ..... *E04G 21/142* (2013.01); *B66F 3/08* (2013.01); *E04B 1/3511* (2013.01); *E04B 5/04* (2013.01)

(58) Field of Classification Search
CPC ..... E04G 21/142; E04B 1/3511; E04B 5/04; B66F 3/08
USPC ..... 52/125.4, 125.2, 125.5, 745.2, 126.1
See application file for complete search history.

(56) References Cited

U.S. PATENT DOCUMENTS

| | | | | |
|---|---|---|---|---|
| 2,075,714 | A * | 3/1937 | Hamill | 411/24 |
| 2,309,451 | A * | 1/1943 | Hasenburger et al. | 52/404.1 |
| 2,625,815 | A * | 1/1953 | Black | E04H 12/2261 52/126.1 |
| 2,772,560 | A * | 12/1956 | Neptune | E04C 5/167 411/108 |
| 2,952,947 | A * | 9/1960 | White | 52/708 |
| 2,954,647 | A * | 10/1960 | Hsiang | 52/707 |
| 3,095,672 | A * | 7/1963 | Di Tullio et al. | 52/710 |
| 3,216,157 | A * | 11/1965 | Pinter | 52/126.5 |
| 3,298,272 | A * | 1/1967 | Henderson | F16B 37/14 411/373 |
| 3,431,012 | A * | 3/1969 | Eriksson et al. | 294/89 |
| 3,590,538 | A * | 7/1971 | Holt | 52/127.3 |
| 3,640,328 | A * | 2/1972 | Tummarello | 411/103 |
| 3,715,851 | A * | 2/1973 | Bennett | 52/707 |
| 4,204,711 | A * | 5/1980 | Lancelot, III | B66C 1/666 294/82.28 |

(Continued)

*Primary Examiner* — Beverly M Flanagan
(74) *Attorney, Agent, or Firm* — McGarry Bair PC

(57) ABSTRACT

A lifting and leveling assembly configured to be embedded in a precast concrete slab for lifting a leveling a precast concrete slab includes a base plate, a threaded sleeve, an anchor plate, a thread protecting sleeve, a threaded lifting bolt and an end cap. Rotating the threaded lifting bolt in a first direction positions a bolt head on the threaded lifting bolt above a top surface of a precast concrete slab to accommodate the attachment of a lifting device. Rotating the threaded lifting bolt in a second direction positions the bolt head beneath the top surface of the concrete slab and causes the threaded shaft to exert a force on the base plate to level the precast concrete slab.

27 Claims, 15 Drawing Sheets

(56) References Cited

U.S. PATENT DOCUMENTS

| | | | | | |
|---|---|---|---|---|---|
| 4,290,638 | A * | 9/1981 | Manning | B66C 1/666 | 294/89 |
| 4,325,575 | A * | 4/1982 | Holt et al. | 294/89 | |
| 4,437,276 | A * | 3/1984 | Goldberg | B28B 7/0008 | 52/125.5 |
| 4,512,121 | A * | 4/1985 | Carydias | E04G 21/142 | 52/125.2 |
| 5,257,490 | A * | 11/1993 | Endo et al. | 52/511 | |
| 5,542,225 | A * | 8/1996 | Endo et al. | 52/511 | |
| 5,623,804 | A * | 4/1997 | Kelly et al. | 52/704 | |
| 5,649,782 | A * | 7/1997 | Frohlich | B28B 23/005 | 403/10 |
| 5,653,078 | A * | 8/1997 | Kies et al. | 52/698 | |
| 6,350,093 | B1 * | 2/2002 | Petersen et al. | 411/82.1 | |
| 6,688,808 | B2 * | 2/2004 | Lee | 404/40 | |
| 7,111,432 | B2 * | 9/2006 | Hansort | E04G 15/04 | 52/125.4 |
| 7,788,860 | B2 * | 9/2010 | Bartman et al. | 52/139 | |
| 8,844,239 | B2 * | 9/2014 | Garot | E04B 1/41 | 52/125.4 |
| 8,875,471 | B2 | 11/2014 | Siqueiros | | |
| 9,062,452 | B2 * | 6/2015 | Espinosa | E04B 1/4171 | |
| 2003/0208969 | A1 * | 11/2003 | Lancelot et al. | 52/125.4 | |
| 2006/0016140 | A1 * | 1/2006 | Smith | 52/295 | |
| 2012/0227335 | A1 | 9/2012 | Eklund et al. | | |
| 2013/0067849 | A1 * | 3/2013 | Espinosa | 52/699 | |
| 2014/0026515 | A1 * | 1/2014 | Espinosa | E04B 1/4171 | 52/700 |
| 2014/0053475 | A1 * | 2/2014 | Siqueiros | E01C 23/10 | 52/125.1 |
| 2015/0096242 | A1 * | 4/2015 | Lin | E04G 15/04 | 52/125.5 |

* cited by examiner

LIFTING AND LEVELING ASSEMBLY FOR PRECAST CONCRETE SLABS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Patent Application No. 61/950,344, filed Mar. 10, 2014 which is incorporated herein by reference in its entirety.

BACKGROUND OF THE INVENTION

1. Field of the Invention

The invention relates generally to the lifting and leveling of precast concrete slabs for use in the construction or repair of concrete surfaces.

2. Description of the Related Art

Precast concrete slabs are commonly used in the construction and repair of concrete surfaces such as concrete roads. Precast concrete slabs are lifted and placed in excavations and then leveled to be even with adjacent slabs. Grout is then pumped underneath the slab to fill and solidify any voids. It is common for precast concrete slabs to have lifting anchors embedded in the concrete so that the slabs may be lifted by a crane and rigging system. The slabs are leveled using precise surveys and excavation, plastic leveling shims, grout leveling pads or a process known as "mud jacking"; however, these leveling techniques can be costly and time consuming.

U.S. Patent Application US2014/0053475 discloses a leveling lift device embedded in the corners of a precast concrete slabs to aid in the lifting and leveling of the precast concrete slabs. The leveling lift device includes a flat base plate, a section of pipe affixed to and standing upwardly from the base plate, a threaded hollow sleeve sized such that the bottom is removably received within the upstanding pipe and a threaded end that is removably received in the upper portion of the threaded hollow sleeve.

When the leveling lift device is embedded into the concrete slab, the base plate is located along the bottom of the slab, the threaded hollow sleeve extends through the slab between the top and the base plate and the threaded end cap is threaded into the threaded sleeve to protect the threads on the threaded sleeve. The end cap has a head which sticks above the upper surface of the concrete slab so that the end cap can be removed after the slab is formed. To lift the slab, the end cap is removed and a threaded bolt is inserted through a lifting device and into the threaded hollow sleeve to secure a lifting device to the slab. The lifting bolt is long enough to extend the length of the threaded shaft to a base plate and to extend above the upper surface of the cement slab. To level the panel, the threaded bolt is rotated in the threaded sleeve until it contacts the base plate wherein further rotation applies a pushing force against the base plate, elevating the slab above as necessary to make the slab level with adjacent slabs. When the slab level, the lifting device and threaded bolt are disposed above the top surface of the panel and grout is pumped beneath the panel to fill the space between the panel and the surface below. After allowing the grout or cement to cured, the threaded bolt and lifting device must be removed from the threaded sleeve and grout or cement must be pumped into the threaded sleeve to fill the void left by the lifting bolt.

The lifting and leveling device presents problems during installation and use, including that the threaded end cap and separate threaded bolt increases the likelihood of misplaced parts during installation. Also, the threaded bolt is always disposed above the surface of the concrete slabs during lifting and leveling, presenting tripping hazards. The lifting and leveling device also requires removing the end cap, inserting the threaded bolt and lifting device and then subsequently removing the threaded bolt and lifting during casting, lifting, leveling and grouting, which adds significant time to the construction or repair of concrete surfaces using precast concrete slabs. The grout beneath the slab must cure before removing the threaded bolt, which is required, also adding time the construction or repair. Furthermore, filling the threaded sleeve with grout or cement prevents subsequent use of the leveling lift device.

SUMMARY OF THE INVENTION

According to the invention, a lifting and leveling assembly for lifting and leveling a precast concrete slab and is configured to be embedded in the precast concrete slab includes a threaded sleeve; an anchor plate fixedly attached to the threaded sleeve and extending transversely thereof; a threaded lifting bolt threaded into the threaded sleeve and including a threaded shaft and a bolt head; a hollow thread protecting sleeve disposed at least in part above the threaded sleeve and encompassing an upper portion of the threaded shaft; a removable end cap selectively covering the bolt head and; and a base plate beneath the threaded sleeve.

In one embodiment, a threaded collar is threaded onto an upper portion of the threaded shaft and positioned within the thread protecting sleeve.

In another embodiment, the anchor plate and the threaded sleeve are integral. They can be integrally formed or made in two pieces and welded together.

In another embodiment, the anchor plate extends 360° around the threaded sleeve.

In yet another embodiment, an outer housing surrounds the threaded sleeve and base plate. In addition, the outer housing may surround at least a portion of the threaded lifting bolt. In addition, the thread protecting sleeve may be slidably received in an upper portion of the outer housing. Further, the thread protecting sleeve may be adjustably retained within the outer housing to adjust an overall height the lifting and leveling assembly defined by the height between the base plate and the top surface of the end cap. The height of the thread protecting sleeve relative to the outer housing may be adjustable. Threaded lifting bolt may also correspond to the overall height of the overall height the lifting and leveling assembly. The outer housing may also include a height adjustment track. A detent mechanism between the thread protecting sleeve and the outer housing may be provided for selectively adjusting the height of the thread protecting sleeve with respect to the outer housing. The detent mechanism may include a protrusion on the thread protecting sleeve that rides in the height adjustment track and a plurality of locking recesses positioned along length of the height adjustment track. The locking recesses are configured to receive the protrusion to position and retain the thread protecting sleeve in the outer housing at predetermined heights.

Preferably, the outer housing covers a top surface of the base plate to reduce adhesion between the base plate and the precast concrete slab. In addition, the outer housing may include a base plate retainer configured to releasably retain the base plate within the outer housing.

In one embodiment, the outer housing is formed from two identical halves which are configured to be joined together around the threaded sleeve and base plate. The two identical halves may be joined together along a vertical seam.

Rotating the exposed bolt head of the threaded lifting bolt in a first direction positions the bolt head above the top surface of the precast concrete slab to accommodate the attachment of a lifting device. Rotating the exposed bolt head of the threaded lifting bolt in a second direction positions the bolt head beneath the top surface of the concrete slab and raises the level of the precast concrete slab.

Further according to the invention, a method of making a lifting and leveling cement slap comprises placing at least one lifting and leveling assembly according as described above into a concrete mold wherein the removable end cap has an upper portion that is abuts an upper surface of the concrete mold and the base plate has a lower surface that abuts a lower portion of the concrete; pouring concrete into the concrete mold; curing the concrete to form a cement slab with the at least one lifting and leveling assembly.

Still further according to the invention, a method of leveling a cement slab in an excavation bed comprises incorporating into a cement slab at least one lifting and leveling assembly as described above wherein the removable end cap has an upper surface that is flush with an upper surface of the precast concrete slab and the base plate has a lower surface that is flush with a lower surface of the precast concrete slab; removing the removable end cap from the or each at least one lifting and leveling assembly; placing the cement slab in an excavation bed adjacent other cement slabs; rotating the threaded lifting bolt of the or each of the at least one lifting and leveling assembly to adjust the height of the cement slab to conform with the height of the adjacent other cement slabs; and filling any voids between the excavation bed and the lower surface of the slab with grout; and filling the void between the top of the threaded lifting bolt and the upper surface of the cement slab with grout.

DESCRIPTION OF THE PREFERRED EMBODIMENT

Figure 2:
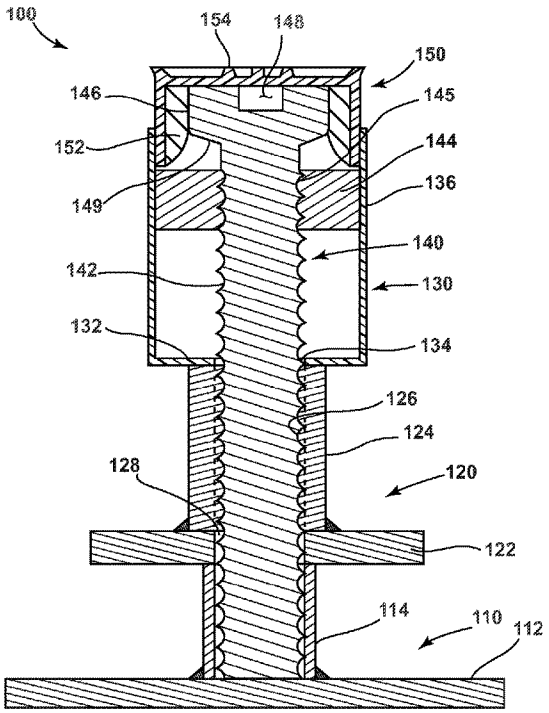
FIG. 2 is a sectional view of the assembled lifting and leveling assembly of FIG. 1.
Figure 1:
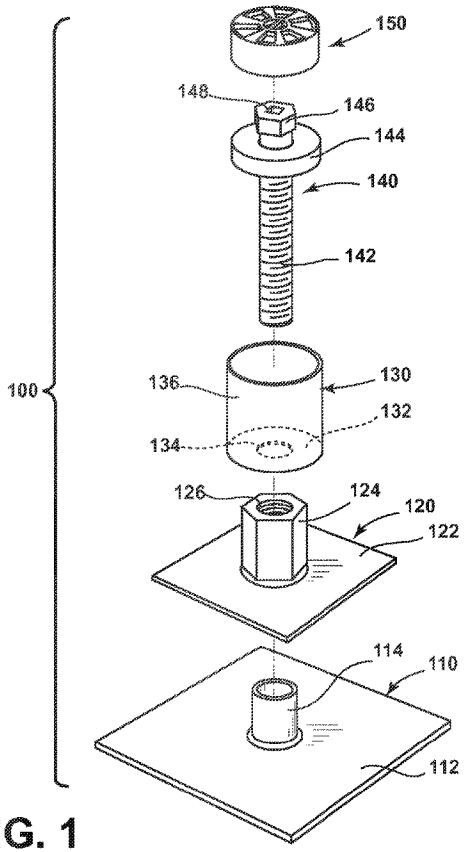
FIG. 1 is an exploded view of a lifting and leveling assembly according to a first embodiment of the invention.

Turning now to the drawings and in particular to FIGS. 1 and 2, there is shown an exploded view and a sectional view of a lifting and leveling assembly 100 respectively according to an embodiment of the invention. The leveling and lifting assembly 100 comprises a rectangular leveling plate 110, an anchoring assembly 120, a thread protecting sleeve 130, an axially supported lifting bolt 140 and an end cap 150.

The rectangular lifting plate 110 comprises hollow cylinder 114 welded to a base plate 112. The base plate 112 and hollow cylinder 114 may be made from high strength steel and dimensioned to compliment the slab thickness.

The anchoring assembly 120 comprises a threaded sleeve in the form of a threaded hex nut 124 affixed to a rectangular anchor plate 122 having a circular through hole 128 coaxially aligned with the threaded hex nut 124 having a threaded through hole 126. The anchoring assembly 120 provides a bearing surface to axially support the axially supported lifting bolt 140. The threaded hex nut 124 and rectangular anchor plate 122 may be made from high strength steel and dimensioned to compliment the slab thickness.

The thread protecting sleeve 130 comprises a hollow cylinder 136 with a circular base 132 having a circular through hole 134. The hollow cylinder 136 and circular base 132 may be integrally formed from high strength steel or welded together from separate pieces or made from high strength thermoset plastics or thermoplastics and may be and dimensioned to compliment the slab thickness.

The axially supported lifting bolt 140 comprises a threaded shaft 142, threaded collar 144 and a hexagon socket head 146 having a square recess 148. An angled surface 149 is formed between the hexagon socket head 146 and threaded shaft 142. Alternatively, the connection between the hexagon socket head 146 and threaded shaft 142 may form a horizontal surface (not shown). The portion of the threaded shaft beneath the hexagon socket head 146 may be unthreaded and the threaded collar 144 may abut the unthreaded portion. The axially supported lifting bolt 140 may be made from high strength steel by methods well known in the art and dimensioned to compliment the slab thickness. The hexagon socket head 146 and square recess 148 may be dimensioned to compliment a variety of socket wrenches and square drivers respectively.

The end cap 150 comprises head engaging boss 152 and protrusions 154. The end cap 150 may be made from thermoset plastics or thermoplastics and may be formed by through methods well known in the art such as injection molding.

Figure 3:
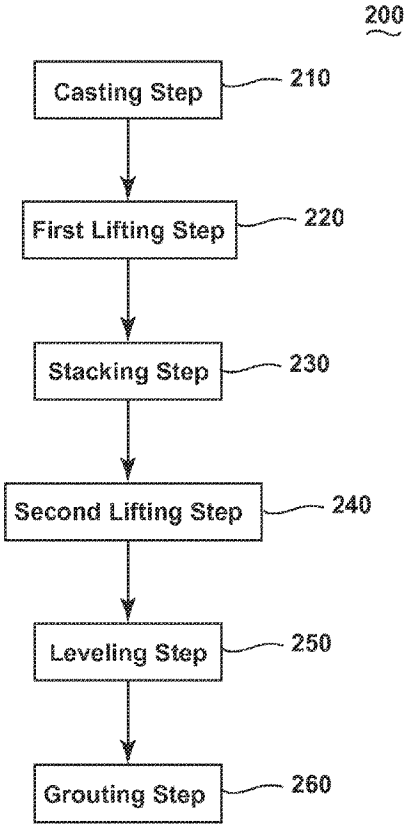
FIG. 3 is a flowchart of method of making and installing a precast concrete slab using the lifting and leveling assembly of FIG. 1 according to an embodiment of the invention.

The rectangular leveling plate 110, anchoring assembly 120, thread protecting sleeve 130, axially supported lifting bolt 140 and end cap 150 are all coaxially aligned such that the axially supported lifting bolt 140 passes through the thread protecting sleeve 130, anchoring assembly 120 and abuts rectangular leveling plate 110 with the end cap 150 disposed on top of the axially supported lifting bolt 140, best shown in FIG. 3. The assembly rests on the rectangular leveling plate 110 with the bottom surface of the anchor plate 122 abutting the top surface of the hollow cylinder 114. The circular base 132 of the thread protecting sleeve 130 abuts the top surface of the threaded hex nut 124. The threaded shaft 142 passes through the circular through hole 134, threads through the threaded hex nut 124, passes through the circular through hole 128 and into the hollow cylinder 114 until abutting the top surface of the base plate 112. The threaded collar 144 is disposed in surrounding contact with the threaded shaft 142 beneath the angled surface 149 abutting the unthreaded portion of the threaded shaft 142 such that the outside vertical surface is in communication with the inside surface of the hollow cylinder 136 to provide a bearing surface to axially support the axially supported lifting bolt 140. A portion of the vertical outside walls of the end cap 150 are also in communication with the inside surface of the hollow cylinder 136 and the head engaging boss 152 encompasses the hexagon socket head 146 so as to secure the end cap 150 to the hexagon socket head 146.

Referring now to FIG. 3, there is shown a flowchart of method 200 of making and installing a precast concrete slab using a lifting and leveling assembly according to an embodiment of the invention. A precast concrete slab using a leveling and lifting assembly 100 according to an embodiment of the invention first undergoes a casting step 210 wherein one or more leveling and lifting assemblies 100 are placed into a slab mold wherein the lower surface of the leveling plate is positioned on a bottom surface of the mold and the upper end cap fits against the lower surface of the upper half of the mold. Cement is then poured into the mold and the cement is cured, thus embedding the leveling and lifting assemblies 100 into the concrete slab. Typically at least four of the leveling and lifting assemblies 100 are embedded into the slab, one at each corner. After casting and curing, a first lifting step 220 lifts the slab for placement into storage or onto transportation using the lifting and leveling assembly 100. Utilizing the lifting and leveling assembly, a stacking step 230 may be performed wherein multiple precast concrete slabs are stacked on top of one another. Once at the installation site, a second lifting step 240 lifts the slab for placement into an excavation or road bed using the lifting and leveling assembly 100. A leveling step 250 uses the lifting and leveling assembly 100 to raise the precast concrete slab so as to be level with adjacent slabs. Once leveled, a grouting step 260 is performed to pump grout into the voids on top of and beneath the slab.

Figure 4:
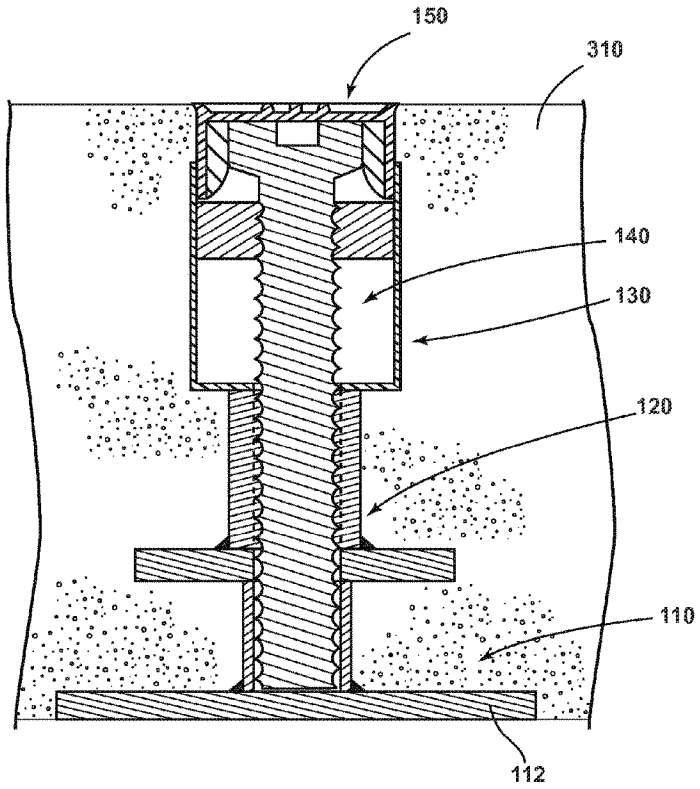
FIG. 4 is a sectional view of the lifting and leveling assembly of FIG. 1 embedded in a concrete slab.

FIG. 4 shows the lifting and leveling assembly 100 in the casting position embedded in a precast concrete slab 310. The lifting and leveling assembly 100 is positioned so that the bottom surface of the base plate 112 is flush with the bottom surface of the precast concrete slab 310 and the top surface of the end cap 150 is substantially flush with the top surface of the precast concrete slab 310. The rectangular leveling plate 110, anchoring assembly 120, thread protecting sleeve 130 and end cap 150 encompass the axially supported lifting bolt 140 so as to prevent concrete from contacting the axially supported lifting bolt 140 during casting.

Figure 5:
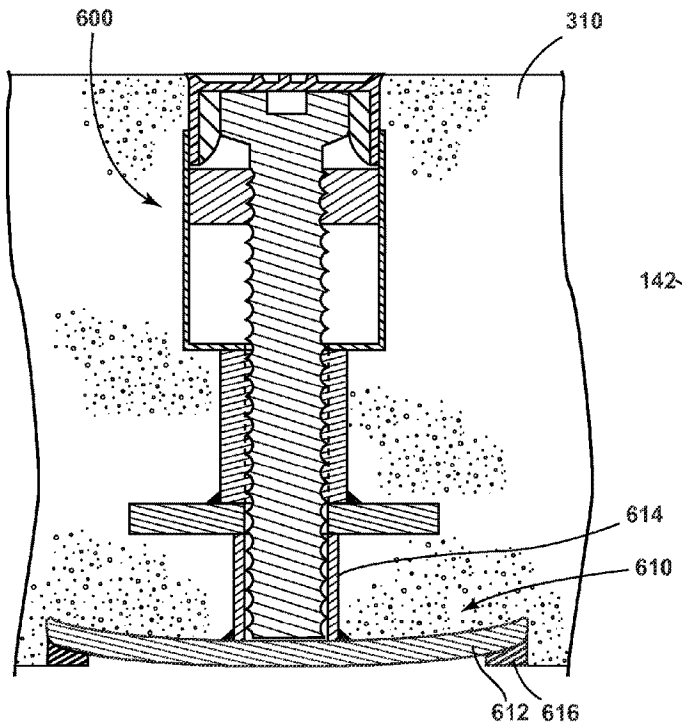
FIG. 5 is a sectional view of a lifting and leveling assembly with a modified base plate embedded in a concrete slab according to an embodiment of the invention.

FIG. 5 shows a lifting and leveling assembly 600 in the casting position embedded in a precast concrete slab 310 according to a modified form of the invention. The lifting and leveling assembly 600 may comprise a hollow cylinder 614 welded to a curved base plate 612. The perimeter of the curved base plate 612 is curved upwards towards the hollow cylinder 614 forming a concavo-convex shape. A leakage preventing material 616 such as plastic tape, foam tape or the like may be positioned on the convex side of the curved base plate 612 at the perimeter so as to prevent the precast concrete slab 310 from flowing beneath the curved base plate 612. The leakage preventing material 616 may be removed after the precast concrete slab 310 is cured and removed from the mold.

Figure 6:
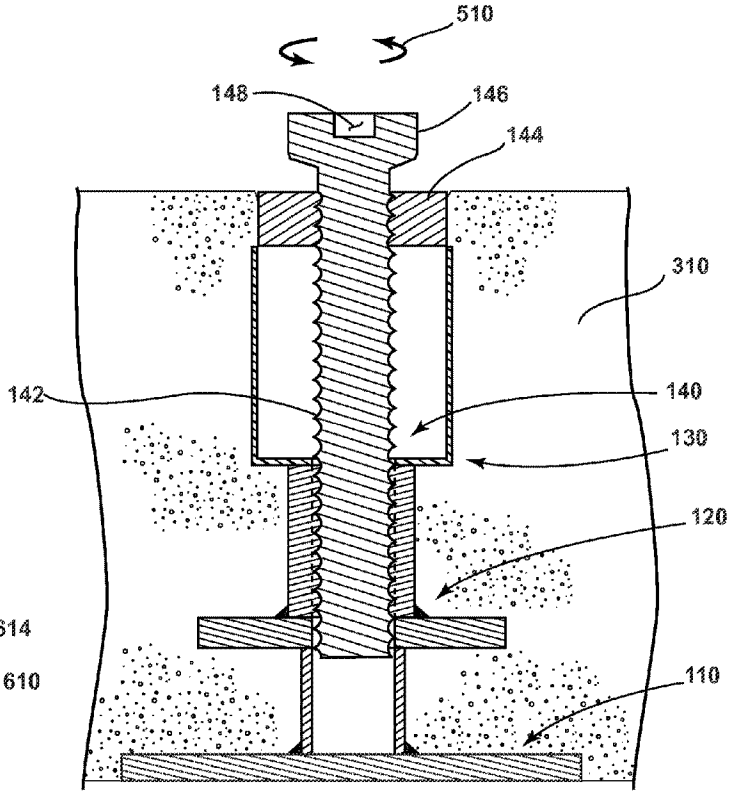
FIG. 6 is a sectional view of the lifting and leveling assembly of FIG. 1 embedded in a concrete slab of in the lifting position.

FIG. 6 shows the lifting and leveling assembly 100 in the precast concrete slab 310 with the axially supported lifting bolt 140 in the lifting position. The end cap 150 is removed exposing the hexagon socket head 146 and the square recess 148. The axially supported lifting bolt 140 is rotated counter clockwise indicated by arrows 510 until the top surface of the threaded collar 144 is flush with the top surface of the precast concrete slab 310. Rotation of the axially supported lifting bolt 140 can achieved using a conventional hex socket wrench which mates with the hexagon socket head 146 or a conventional square driver which mates with the square recess 148. When rotated, the threaded shaft 142 in rotatable engagement with anchoring assembly 120 also rotates, moving the axially supported lifting bolt 140 away from the rectangular leveling plate 110. The anchoring assembly 120 is anchored in the precast concrete slab 310 ad thus does not rotate or move with the bolt 140. During rotation, the outside surface of the threaded collar 144 bears against either the thread protecting sleeve 130 or the precast concrete slab 310 so that any radial forces applied to the axially supported lifting bolt 140 are directed into precast concrete slab 310 so as not to deform the threaded bolt 142.

Figure 8:
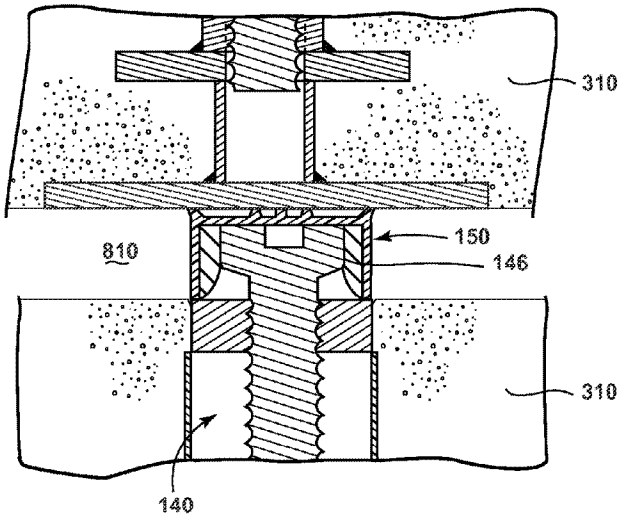
FIG. 8 is a sectional view of the lifting and leveling assembly of FIG. 1 embedded in a concrete slab in a stacking position.

With the hexogen socket head 146 exposed, a conventional lifting eye 710 may be secured to the hexagon socket head 146 as shown in FIG. 8. The conventional lifting eye 710 may be any commercially available lifting eye similar in construction and operation to U.S. Pat. No. 4,703,595. A crane (not shown) may then attach to the lifting eye 710 using a rigging system (not shown) to lift the precast concrete slab 310. It will be understood that common precast concrete slabs are rectangular in shape and to lift properly, a lifting and leveling assembly 100 may be disposed at each corner of the precast concrete slab 310 so as to properly distribute the load during lifting.

Figure 9:
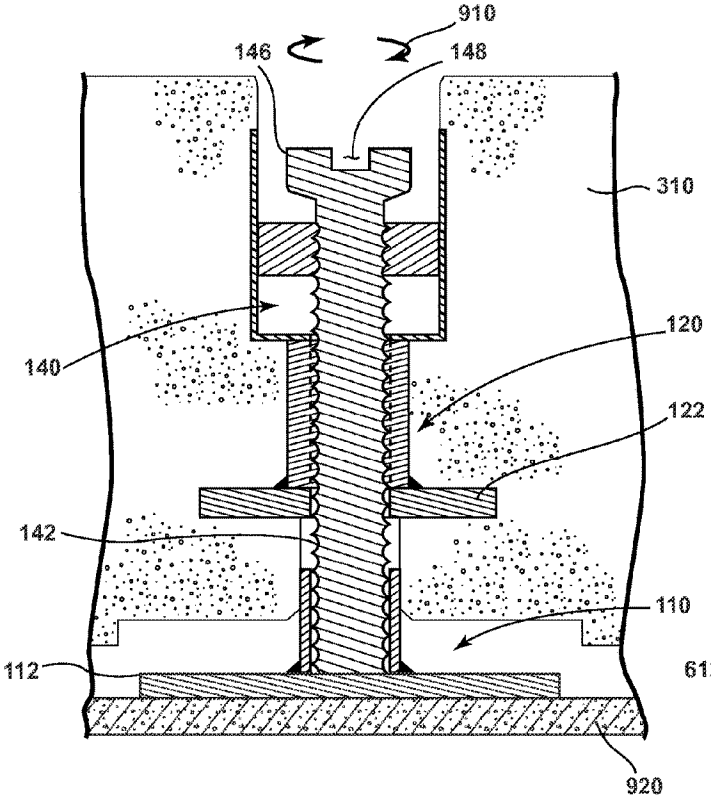
FIG. 9 is a sectional view of the lifting and leveling assembly of FIG. 1 embedded in a concrete slab in the leveling position.

To save space during storage or transportation, the lifting and leveling assembly 100 may facilitate the stacking of precast concrete slabs 310 as shown in FIG. 9. The end cap 150 may be reinstalled over the hexagon socket head 146 with the axially supported lifting bolt 140 still in the lifting position shown in FIG. 8. Another precast concrete slab 310 with or without an embedded lifting and leveling assembly 100 may be place on top of the end cap 150 so as to create a gap 810 between the top surface and bottom surface of the precast concrete slabs 310. The gap 810 may enable the forks of a fork lift to fit between the two precast concrete slabs 310 so that the fork truck may lift and transport the precast concrete slabs 310. The end cap 150 acts as a bearing pad so as to protect the hexagon socket head 146. Alternatively, the end cap 150 may be omitted and the precast concrete slab may be placed directly on top of the hexagon socket head 146.

Figure 7:
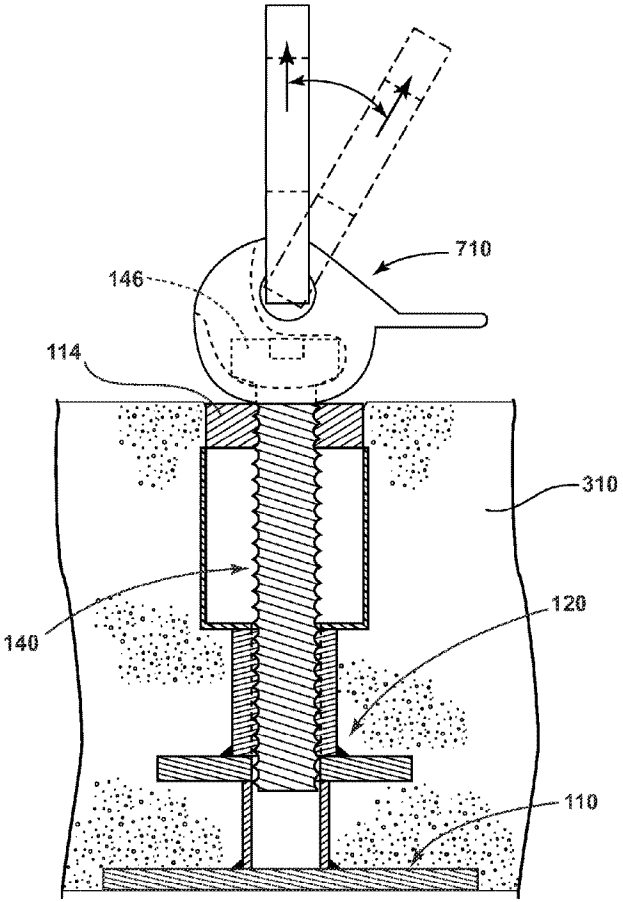
FIG. 7 is a sectional view of the lifting and leveling assembly of FIG. 1 embedded in a concrete slab in the lifting position with a pivoting lifting eye installed.

To install the precast concrete slab 310 in an excavation, the precast concrete slab is lifted as shown and described in FIGS. 6 and 7 and positioned in the excavation or road bed. Once positioned in the excavation, the precast concrete can be raised and leveled as shown in FIG. 9. Using a hex socket wrench which mates with the hexagon socket head 146 or a square driver which mates with the square recess 148, the axially supported lifting bolt 140 may be rotated clockwise as indicated by arrows 910 driving the axially supported lifting bolt 140 toward the rectangular leveling plate 110 so that the bottom surface of the threaded bolt 142 contacts the top surface of the base plate 112. Continued rotation of the axially supported lifting bolt 140 raises the slab and separates the rectangular leveling plate 110 from the anchoring assembly 120. The anchoring assembly 120 in mating engagement with the threaded bolt 142 acts as a axial guide for the axially supported lifting bolt 140 and directs upward reaction force exerted by the excavation bed 920 into the precast concrete slab 310 raising the precast concrete slab 310. In this way the level of the precast concrete slab 310 relative to the excavation bed 920 can be adjusted so as to be level with adjacent slabs. It will be understood that common precast concrete slabs are rectangular in shape and to level properly, a lifting an leveling assembly 100 may be disposed at or near each corner of the precast concrete slab 310 so as to raise and level each corner of the precast concrete slab 310. It will also be understood that an excavation bed 920 may be any surface on which the precast concrete slab 310 is to be placed upon.

Figure 10:
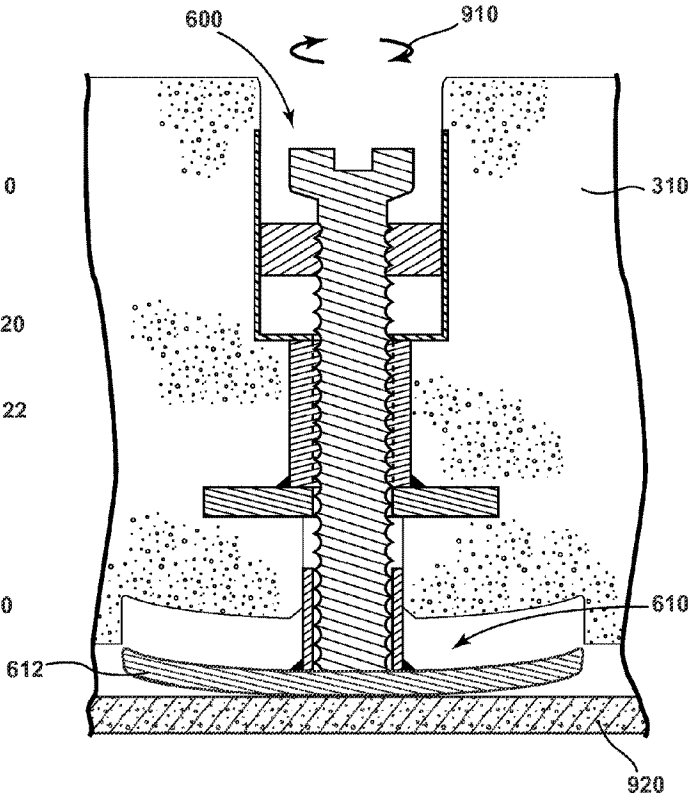
FIG. 10 is a sectional view of the lifting and leveling assembly FIG. 5 embedded in a concrete slab in the leveling position.

FIG. 10 shows the lifting and leveling assembly 600 in the leveling position with a rectangular leveling plate 610 having a curved base plate 612 positioned in an excavation bed 920 to raise and level a precast concrete slab 310 according to another embodiment. The curved perimeter of the curved base plate 612 protects any material coating or covering the excavation bed 920 in the event of any lateral movement of the precast concrete slab 310 and lifting and leveling assembly 600. The curved edges eliminate any sharp edges contacting the excavation bed 920 which may puncture or damage a material coating or covering the excavation bed 920. The curved edges also facilitate lateral movement of the precast concrete slab 310 by eliminating sharp edges contacting the excavation bed 920 which may cause a plow effect and hinder lateral movement.

Figure 12:
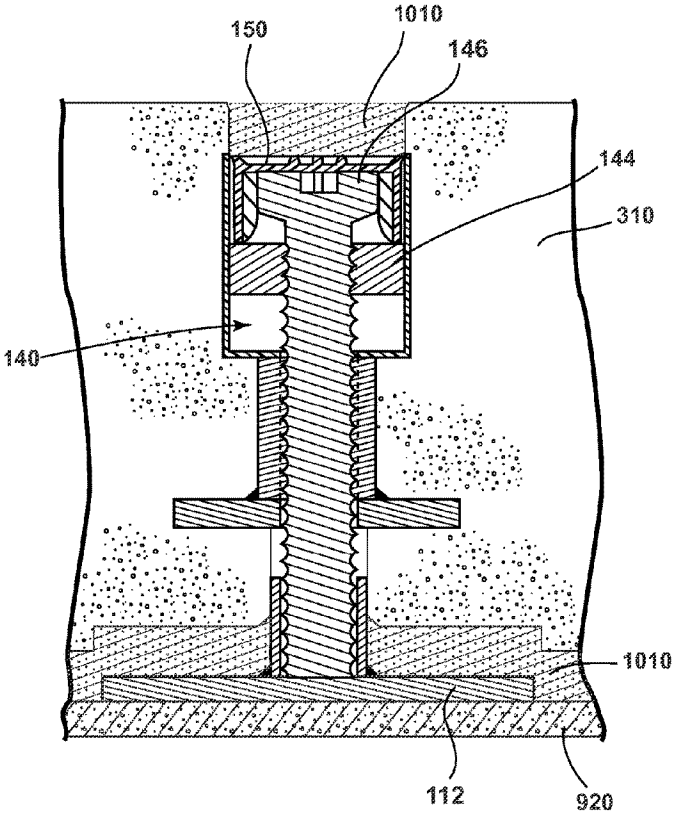
FIG. 12 is a sectional view of a lifting and leveling assembly of FIG. 1 embedded in a leveled concrete slab with the voids filled with grout and the end cap placed above the lifting bolt.
Figure 11:
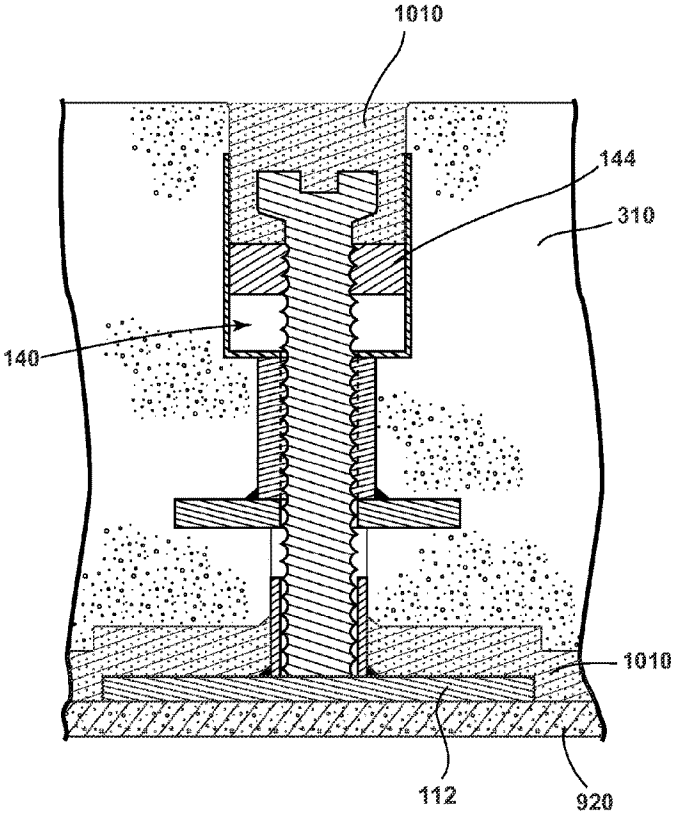
FIG. 11 is a sectional view of a lifting and leveling assembly of FIG. 1 embedded in a leveled concrete slab with the voids filled with grout.

Once the desired level is achieved, a suitable grout 1010 may be pumped on top and beneath the precast concrete slab 310 to fill and solidify the void between the excavation bed 920 and the precast concrete slab 310 and the void between the threaded collar 144 and the top surface of the precast concrete slab 310 as shown in FIG. 11. Alternatively, the end cap 150 may be reinstalled on the axially supported lifting bolt 1140 and grout may fill the void between the top surface of the end cap 150 and the top surface of the precast concrete slab 310 as illustrated in FIG. 12.

Figure 13:
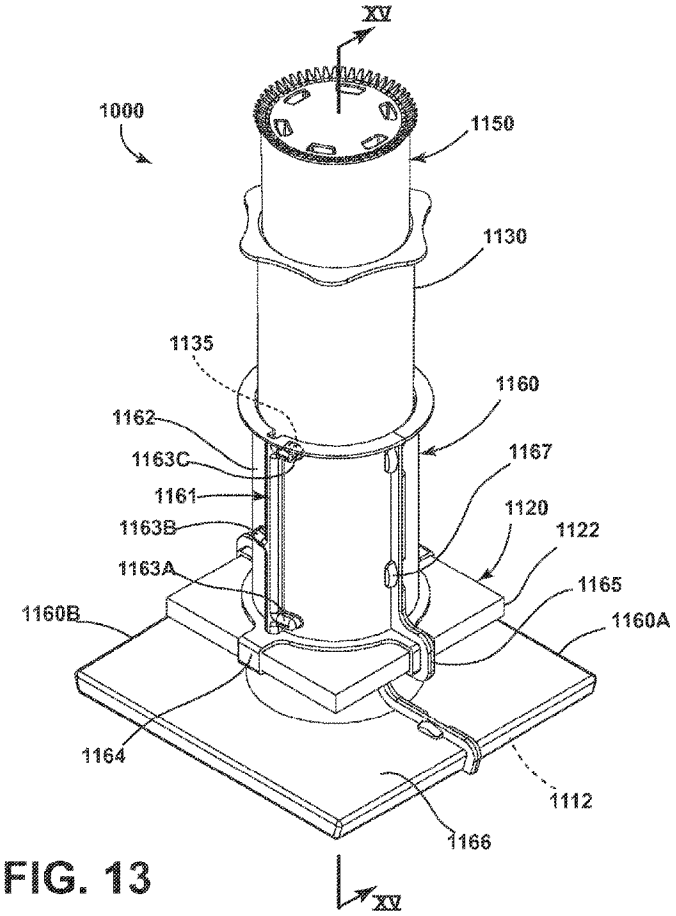
FIG. 13 is a perspective view of a lifting and leveling assembly according to a second embodiment of the invention.
Figure 14:
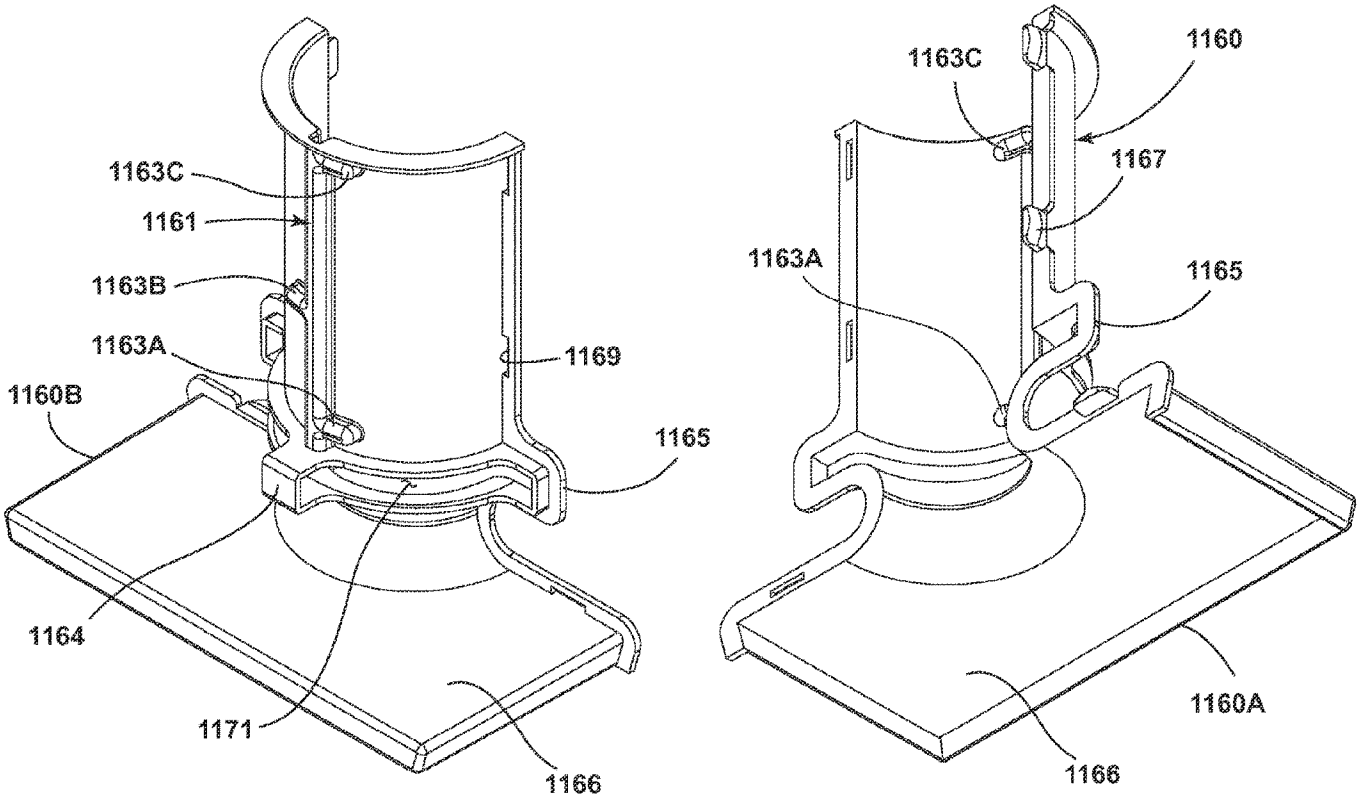
FIG. 14 is a perspective view of an outer housing of the lifting and leveling assembly of FIG. 13.

Now referring to FIG. 13 and FIG. 14, in a another embodiment of the invention where like elements from the leveling lifting assembly 100 shown in FIGS. 1-12 are identified with the same reference numeral increased by 1000, a lifting and leveling assembly 1100 includes an outer housing 1160. The outer housing 1160 comprises a cylindrical cover sleeve 1162, anchor plate retainers 1164 and a base plate cover 1166. The end cap 1150, thread protection sleeve 1130 and outer housing 1160 are configured to communicate with one another to sheath and retain the interior components of the lifting and leveling assembly 1100. The thread protecting sleeve 1130 is slidably received in an upper portion of the outer housing 1160 and the end cap 1150 is slidably received in the upper portion of the thread protecting sleeve 1130. The outer housing 1160 may be made from thermoset plastics or thermoplastics and may be formed by through methods well known in the art such as injection molding.

The cylindrical sleeve 1162 comprises a height adjustment track 1161 and height locking recesses 1163 A-C. The thread protection sleeve 1130 is configured to be adjustably retained within the cylindrical sleeve 1162 and includes a locking protrusion 1135 at the lower end which rides inside the height adjustment track. By vertically adjusting the height of the thread protecting sleeve 1130 relative the cylindrical sleeve 1162 in a telescoping fashion, the locking protrusion 1135 may be aligned with and retained by one of the height locking recesses 1163 A-C. In this way, the overall height of the lifting and leveling assembly 1100, defined by the height between the base plate 1112 and the top surface of the end cap 1150 may be adjusted so as to accommodate concrete slabs having different thicknesses.

The outer housing 1160 may be formed by two interconnecting housing halves 1160A, 1160B attached together along vertical seam 1165 by corresponding male connectors and female connectors along the vertical 1165 seam. The male connectors may be spring clips 1165 and the female connectors may be apertures 1169 corresponding to the spring clips 1167 as illustrated. The two piece design allows the outer housing 1160 to be easily assembled around the anchoring assembly 1120 and anchor plate 1122 such that the anchor plate 1122 extends through a gap 1171 formed in the outer housing 1160 between the anchor plate retainers 1164. It will be understood that the two interconnecting housing halves 1160A, 1160B may be attached together by any attachment means well known in the art including but not limited to clips, snaps, nails, screws, bolts, adhesives, welds or rivets.

Figure 15:
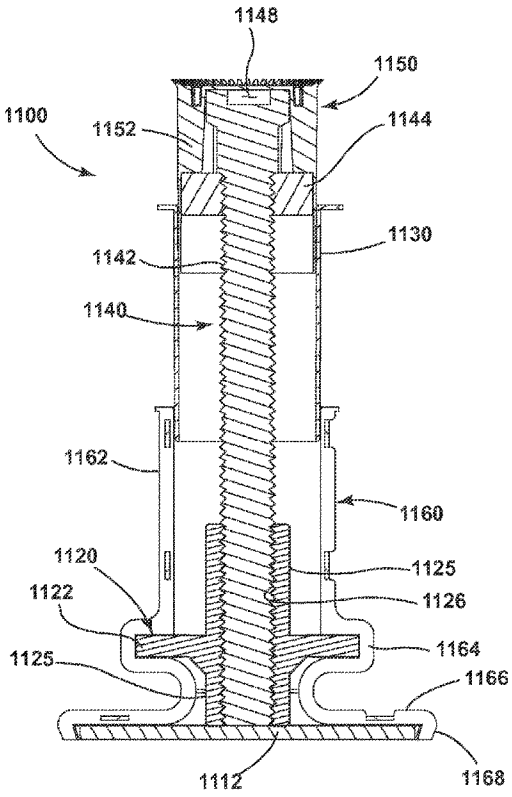
FIG. 15 is a vertical sectional view of the lifting and leveling assembly of FIG. 13 taken along line XV-XV of FIG. 13.

Referring now to FIG. 15, the anchoring assembly 1120 comprises a threaded sleeve 1125 and an anchor plate 1122 attached to the threaded sleeve 1125 and extending transversely therefrom such that the threaded sleeve 1125 is disposed above and below the anchor plate 1122. The anchor plate 1122 may extend 360° around the threaded sleeve 1125. Alternatively, outwardly extending rebar attached to the threaded sleeve 1125 may be used with or in lieu of the anchor plate 1122. The base plate 1112, anchoring assembly 1120, thread protecting sleeve 1130, axially supported lifting bolt 1140 and end cap 1150 are all coaxially aligned such that the axially supported lifting bolt 1140 passes through the thread protecting sleeve 1130 and anchoring assembly 1120. The anchoring assembly 1120 rests on the base plate 1112 with the bottom surface of the threaded sleeve 1125 abutting the top surface of the base plate 1112. The outer housing 1160 surrounds at least a portion of the axially supported lifting bolt 1140, the threaded sleeve 1125 and base plate 1112 to prevent concrete from contacting the axially supported lifting bolt 1140.

The base plate cover 1166 comprises downwardly extending legs 1168. The downwardly extending legs 1168 selectively retain the base plate 1112 within the base plate cover 1166. The legs 1168 may be dimensioned such that the friction force between the legs 1168 and side surfaces of the base plate 1112 retains the base plate 1112 within the base plate cover 1166 absent of any axially supported lifting bolt 1140 induced force. When a force is exerted on the top surface of the base plate 1112 by the axially supported lifting bolt 1140 being threaded further into the anchor assembly 1120, the force exerted on the base plate 1112 over comes the friction force, allowing the base plate 1112 to move downwards and away from the base plate cover 1166.

Figure 16:
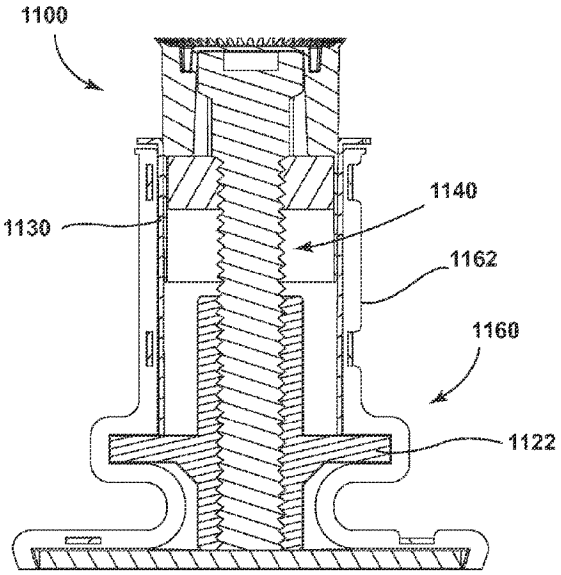
FIG. 16 is a sectional view of the lifting and leveling assembly of FIG. 13 in a collapsed form.

FIG. 16 shows the lifting and leveling assembly 1100 with the thread protecting sleeve 1130 positioned to achieve a lower overall height of the lifting and leveling assembly 1100 and an axially supported lifting bolt 1140 having a length corresponding to the lower height. The thread protecting sleeve 1130 is moved downward within the cylindrical sleeve 1162 of the outer housing 1160 in a telescoping fashion. The thread protecting sleeve 1130 may be moved downward until the abutting the anchor plate 1122 as illustrated or to an intermediate height where it may be retained in the desired position by the locking recesses 1163 A-C (FIG. 15) as described above. The axially supported lifting bolt 1140 provided may also correspond to any of the intermediate heights. It will be understood that the thread protecting sleeve 1130 may be adjusted to realize a lifting and leveling assembly 1100 having a variety of predetermined heights which may correspond to standard thickness of precast concrete slabs. For example, the lifting and leveling assembly 1100 may be adjustable to achieve overall heights in the range of 7" to 13".

Figure 17:
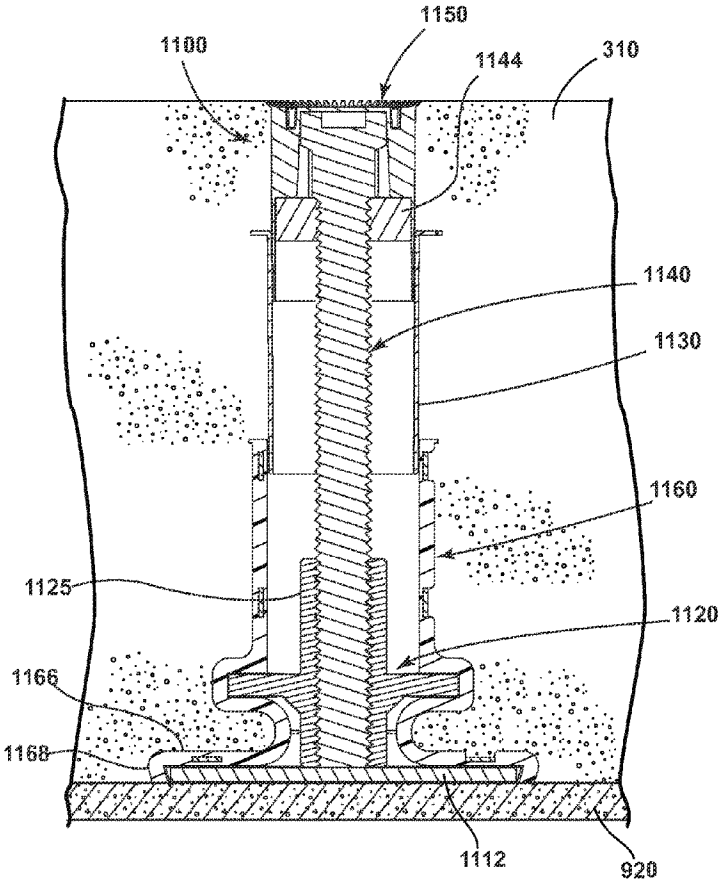
FIG. 17 is a sectional view of the lifting and leveling assembly of FIG. 13 embedded in a concrete slab in an initial positon seated in a roadbed.

FIG. 17 shows the lifting and leveling assembly 1100 in the casting position embedded in a precast concrete slab 310 and positioned on an excavation bed 920. The lifting and leveling assembly 1100 is positioned so that the bottom surface of the legs 1168 are flush with the bottom surface of the precast concrete slab 310 and the top surface of the end cap 150 is substantially flush with the top surface of the precast concrete slab 310. The anchoring assembly 1120, thread protecting sleeve 1130, end cap 150 and outer housing 1160 encompass the axially supported lifting bolt 140 so as to prevent concrete from contacting the axially supported lifting bolt 1140, the threaded collar 1144, threaded sleeve 1125 and the base plate 1112 during casting.

Figure 18:
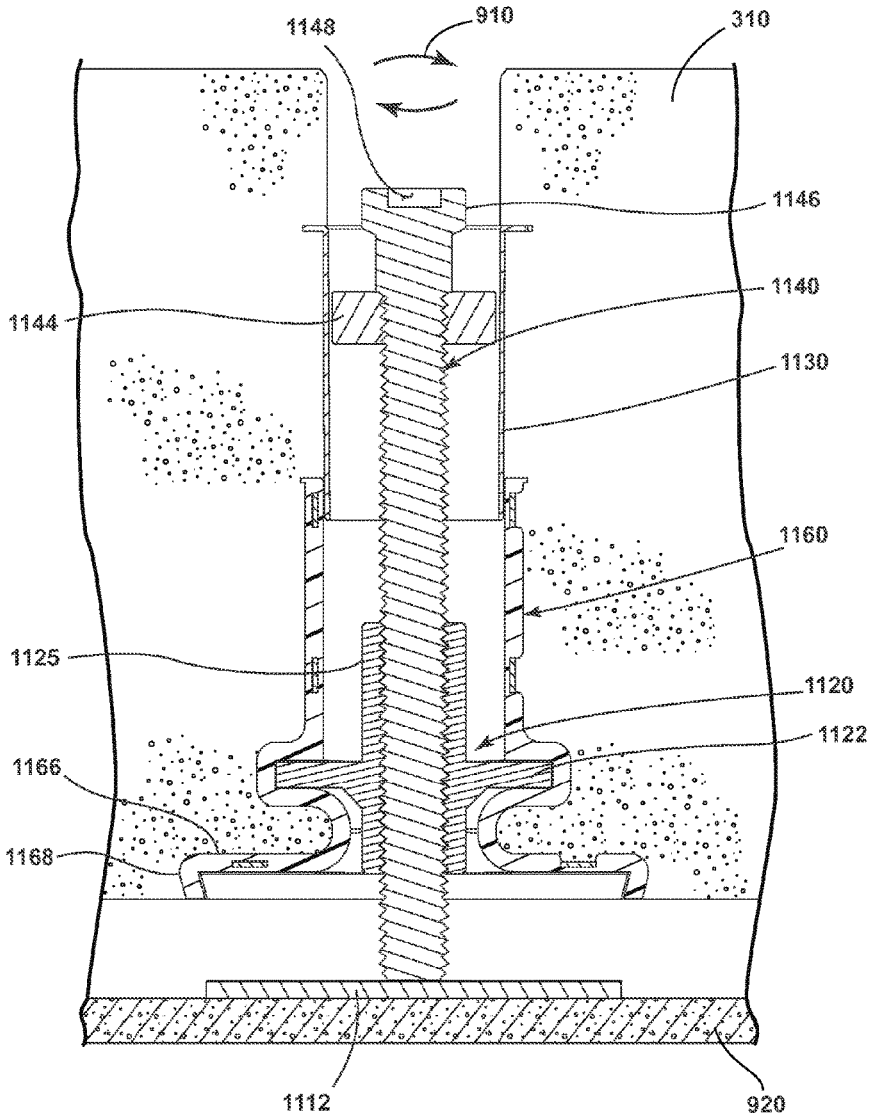
FIG. 18 is a sectional view of the lifting and leveling assembly of FIG. 13 embedded in a concrete slab in a leveled position in a roadbed.

To install the precast concrete slab 310 in an excavation, the precast concrete slab is lifted as shown and described in FIGS. 6 and 7 and positioned in the excavation bed 920. Once positioned in the excavation, the precast concrete can be raised and leveled as shown in FIG. 18. Using a hex socket wrench which mates with the hexagon socket head 1146 or a square driver which mates with the square recess 1148, the axially supported lifting bolt 1140 may be rotated clockwise as indicated by arrows 910 driving the axially supported lifting bolt 1140 toward the base plate 1112 so that the bottom surface of the axially supported lifting bolt 1140 contacts the top surface of the base plate 1112. Continued rotation of the axially supported lifting bolt 1140 causes the base plate 1112 to be separate from bottom surface of the anchoring sleeve 1125 of the anchoring assembly 1120 and exert a downward force on the excavation bed 920. The anchoring assembly 1120 in mating engagement with the axially supported lifting bolt 1140 acts as a axial guide for the axially supported lifting bolt 1140 and directs upward reaction force exerted by the excavation bed 920 into the precast concrete slab 310 causing the precast concrete slab 310 to be raised. As the precast concrete slab 310 is raised, the base plate 1112 separates from the base plate cover 1166. Because the base plate cover 1166 shields the base plate 1112 from the concrete, there is no adhesion between the base plate 1112 and the precast concrete slab 310 that may prevent the base plate 1112 from being separated from the anchoring assembly 1120. In this way, the level of the precast concrete slab 310 relative to the excavation bed 920 can be adjusted so as to be level with adjacent slabs. It will be understood that common precast concrete slabs are rectangular in shape and to level properly, a lifting an leveling assembly 1100 may be disposed at each corner of the precast concrete slab 310 so as to raise and level each corner of the precast concrete slab 310. It will also be understood that an excavation bed 920 may be any surface on which the precast concrete slab 310 is to be placed upon.

Once the desired level is achieved, a suitable grout may be pumped beneath the precast concrete slab 310 from separate fill holes to fill and solidify the void between the excavation bed 920 and the precast concrete slab 310. In addition, the void between the threaded collar 1144 and the top surface of the precast concrete slab 310 can be filled as well with grout as described above and shown in FIG. 11. The end cap may also be reinstalled prior to pumping grout so that the grout fills the void between the top surface of the end cap and the top surface of the precast concrete slab 310 as described above and shown in FIG. 12. To reuse the lifting and leveling assembly 1100, the grout above the end cap may be drilled out and the end cap removed to expose the axially supported lifting bolt 1140.

Figure 19:
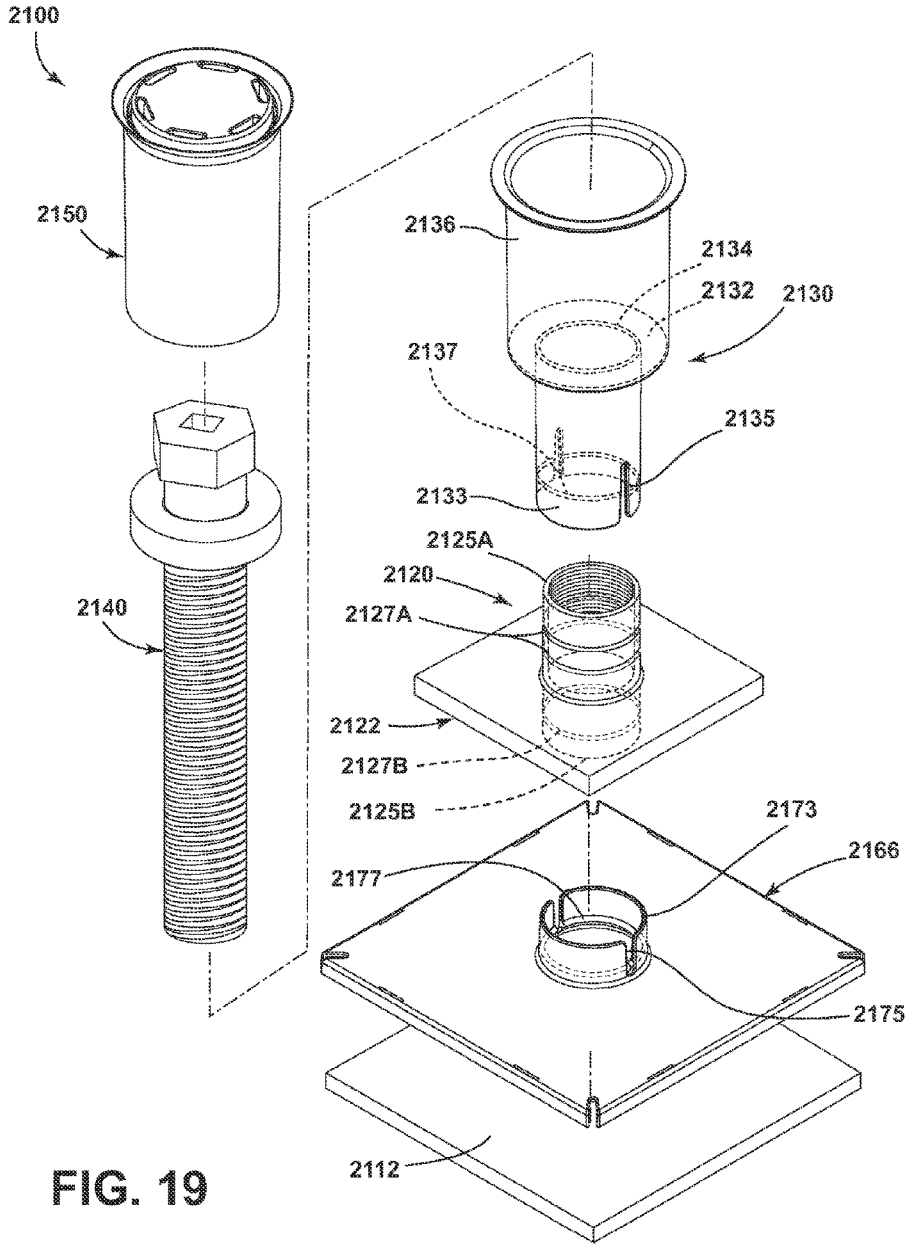
FIG. 19 is an exploded view of a lifting and leveling assembly according to a third embodiment of the invention.

Now referring to FIG. 19, in a another embodiment of the invention where like elements from the leveling lifting assembly 100 shown in FIGS. 13-18 are identified with the same reference numeral increased by 2000 and where like elements from the leveling lifting assembly 1100 shown in FIGS. 13-18 are identified with the same reference numeral increased by 1000, a lifting and leveling assembly 2100 includes a thread protecting sleeve 2130 attached to an anchoring assembly 2120. The thread protecting sleeve 2130 comprises an upper hollow cylinder 2136 with a circular base 2132 having a circular through hole 2134 and a lower hollow cylinder 2133 extending downwardly from the circular base 2132 about the perimeter of the circular through hole 2134. The lower hollow cylinder 2133 comprises a pair of slots 2135 configured to allow the lower hollow cylinder 2133 to flex radially and a snap ring 2137 disposed on the inner surface of the lower hollow cylinder 2133, protruding inwardly therefrom.

The anchoring assembly 2120 comprises a threaded sleeve having an upper threaded portion 2125A and a lower threaded portion 2125B and an anchor plate 2122 disposed between the threaded portions 2125A, B and extending laterally therefrom. Both the threaded portions comprise annular grooves 2127 A, B disposed on the outer surface thereof.

The lifting and leveling assembly 2100 also comprises a base plate cover 2166 configured to selectively retain the base plate 2112 within the base plate cover 2166 as described in the second embodiment. The base plate cover 2166 comprises an upstanding cylinder 2173 extending upwardly from the top surface of the base plate cover 2166. The upstanding cylinder 2173 comprises a pair of slot 2175 configured to allow the upstanding sleeve 2133 to flex radially and a snap ring 2177 disposed on the inner surface of the upstanding cylinder 2173, protruding inwardly therefrom.

The snap ring 2137 of the lower hollow cylinder 2133 is configured to be received within one of the annular grooves 2127A on the upper portion 2125A of the anchoring assembly 2120 to affix the thread protecting sleeve 2130 to the anchoring assembly 2120. The snap ring 2177 of the base plate cover 2166 is configured to be received within one of the annular grooves 2127B on the lower portion 2125B of the anchoring assembly 2120 to affix the base plate cover 2166 to the anchoring assembly 2120.

When lifting and leveling assembly 2100 is assembled, the base plate 2112 is selectively retained in the base plate cover 2166, the base plate cover 2166 and thread protecting sleeve are affixed to the anchoring assembly 2120, the axially supported lifting bolt 2140 is rotatably received within the thread protection sleeve 2130, anchoring assembly 2120 and the base plate cover 2166 until in contact with the base plate 2112 and the end cap 2150 is slidably received within the upper hollow cylinder 2136 of the thread protection sleeve 2130 and is disposed above and around the axially supported lifting bolt 2140. In this way, all of the elements of the lifting and leveling assembly 2100 form an assembled package with no loose parts. The thread protecting sleeve 2130 and base plate cover 2166 may be made from thermoset plastics or thermoplastics and may be formed by through methods well known in the art such as injection molding.

Figure 20:
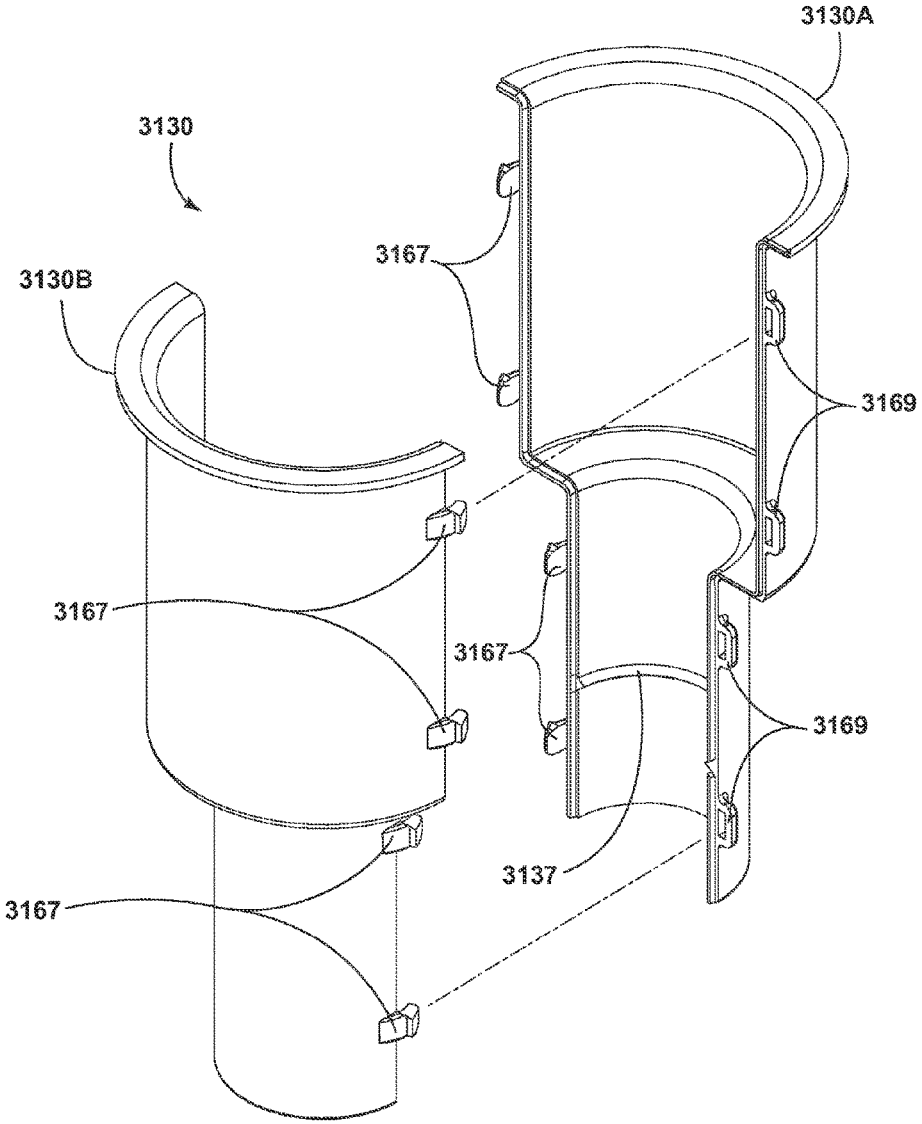
FIG. 20 is a perspective view of a thread protecting sleeve of the lifting and leveling assembly according to another embodiment of the invention.

FIG. 20 shows another embodiment of a thread protecting sleeve 3130 to be used with the lifting and leveling assembly 2100 shown in FIG. 19. The thread protecting sleeve 3130 is formed by two interconnecting sleeve halves 1160A, 1160B attached together along a vertical seam by corresponding male connectors and female connectors along the vertical seam. The male connectors may be spring clips 3167 and the female connectors may be apertures 3169 corresponding to the spring clips 3167 as illustrated. The two piece design allows the thread protecting sleeve 3130 to be easily assembled around the anchoring assembly 2120 shown in FIG. 19. It will be understood that the two interconnecting sleeve halves 3130A, 3160B may be attached together by any attachment means well known in the art including but not limited to clips, snaps, nails, screws, bolts, adhesives, welds or rivets.

Figure 22:
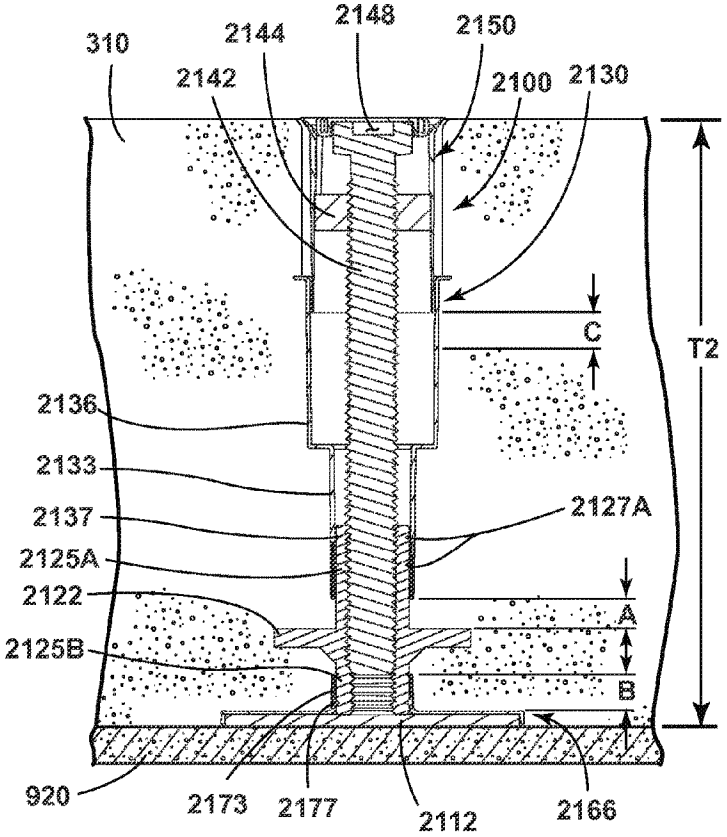
FIG. 22 is a sectional view of the lifting and leveling assembly of FIG. 19 in a second position embedded in a concrete slab in an initial positon seated in a roadbed.
Figure 21:
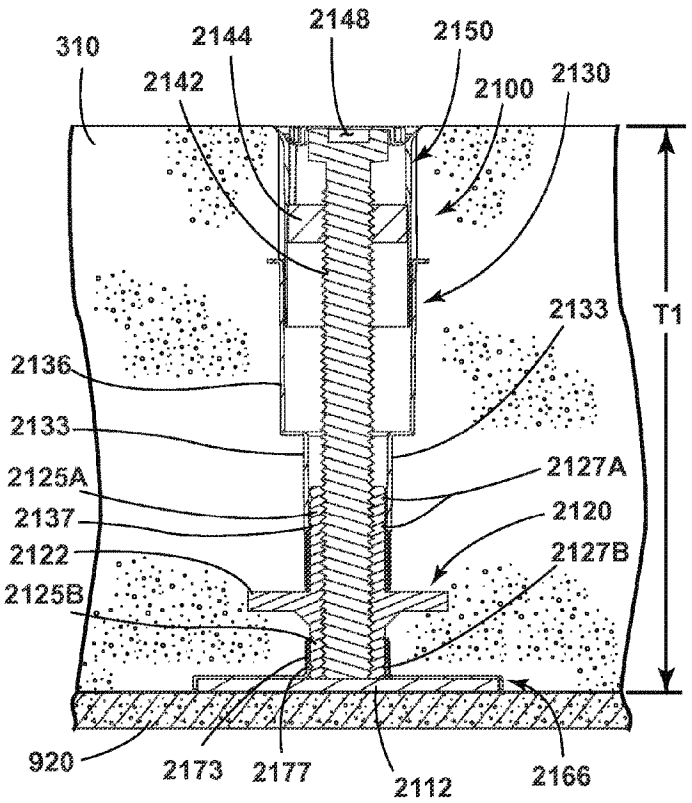
FIG. 21 is a sectional view of the lifting and leveling assembly of FIG. 19 in a first position embedded in a concrete slab in an initial positon seated in a roadbed.

FIGS. 21 and 22 show the lifting and leveling assembly 2100 in the casting position embedded in a precast concrete slab 310 and positioned on an excavation bed 920 wherein the precast concrete slab 310 in FIG. 21 has a thickness T1 and the precast concrete slab 310 in FIG. 22 has a thickness T2 which is larger than T1. The lifting and leveling assembly 2100 is positioned so that the bottom surface of the base plate 2122 is flush with the bottom surface of the precast concrete slab 310 and the top surface of the end cap 150 is substantially flush with the top surface of the precast concrete slab 310. The anchoring assembly 2120, thread protecting sleeve 2130, end cap 150 and base plate cover 2160 encompass the axially supported lifting bolt 2140 so as to prevent concrete from contacting the axially supported lifting bolt 2140, the threaded collar 2144, threaded sleeve 2125 and the base plate 2112 during casting.

To accommodate the larger thickness T2 of the precast concrete slab 310 in FIG. 22, the overall height of the lifting and leveling assembly 2100 may be adjusted in two ways. First, the snap ring 2137 on the lower hollow cylinder 2133 received in the lower most annular groove 2125A as shown in FIG. 21 may be removed and received in the upper most annular groove 2125A as shown in FIG. 21. In this way a gap A is formed between the anchor plate 2122 and the lower portion of the lower hollow cylinder 2133, thereby raising the height of the thread protection sleeve 2130. Second, the axially supported lifting bolt 2140 may be rotated so as to form a gap B between the base plate 2112 and the bottom of the axially supported lifting bolt 2140. The end cap 2150 may also slide upwards within the thread protection sleeve 2130 a distance C that corresponds to the gap B. In this way the overall height of the lifting and leveling assembly 2100 may be adjusted at infinite intervals so long as the axially supported lifting bolt 2140 is received within the anchoring assembly 2120 and the end cap 2150 is received within the thread protecting sleeve 2030.

To install the precast concrete slab 310 in an excavation, the precast concrete slab is lifted as shown and described in FIGS. 6 and 7 and positioned in the excavation bed 920. Once positioned in the excavation, the precast concrete slab 310 can be raised and leveled as shown and described in FIG. 18.

Once the desired level is achieved, a suitable grout may be pumped beneath the precast concrete slab 310 from separate fill holes to fill and solidify the void between the excavation bed 920 and the precast concrete slab 310. In addition, the void between the threaded collar 2144 and the top surface of the precast concrete slab 310 can be filled as well with grout as described above and shown in FIG. 11. The end cap 2150 may also be reinstalled prior to pumping grout so that the grout fills the void between the top surface of the end cap and the top surface of the precast concrete slab 310 as described above and shown in FIG. 12. To reuse the lifting and leveling assembly 2100, the grout above the end cap may be drilled out and the end cap 2150 removed to expose the axially supported lifting bolt 2140.

Figure 23:
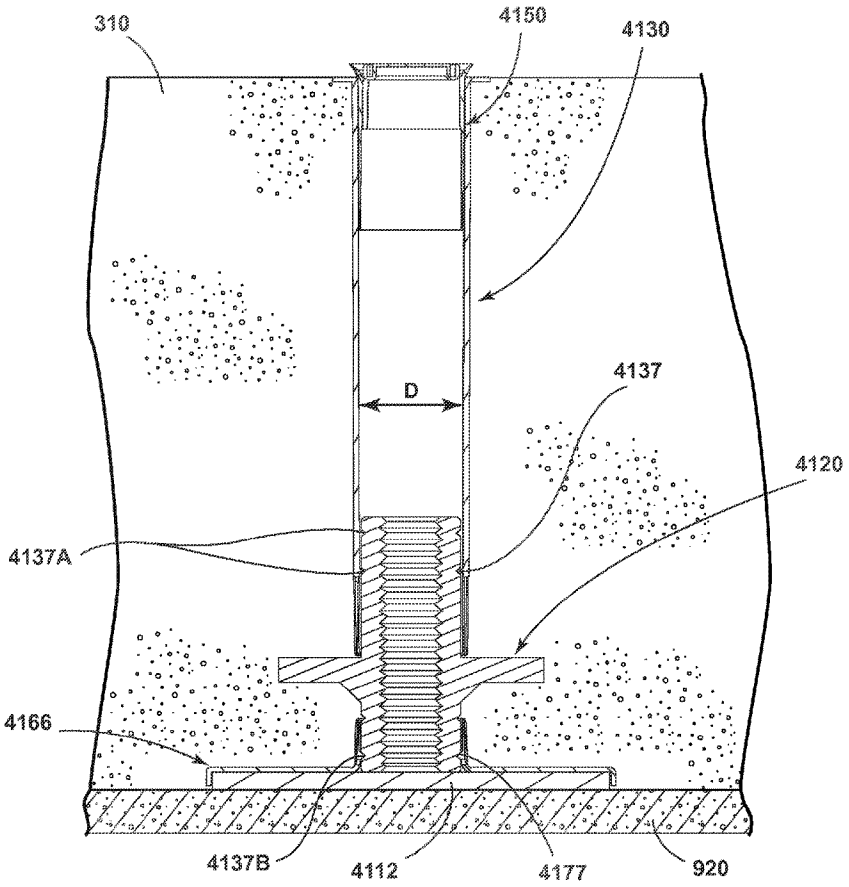
FIG. 23 is a sectional view of a lifting and leveling assembly embedded in a concrete slab in an initial positon seated in a roadbed according a third embodiment of the invention.

Now referring to FIG. 23, in a another embodiment of the invention where like elements from the leveling lifting assembly 2100 shown in FIGS. 19, 21 and 22 are identified with the same reference numeral increased by 2000, a lifting and leveling assembly 4100 includes a thread protecting sleeve 2130 having a consistent inner diameter D. The thread protecting sleeve 2130 comprises a snap ring 4137 disposed on the inner surface thereof and protruding inwardly therefrom to be received within the annular grooves 4127A on the anchoring assembly 4120 in order to affix the thread protection sleeve 4130 to the anchoring assembly 4120. As shown in the casting position embedded in a precast concrete slab 310 and positioned on an excavation bed 920, the lifting and leveling assembly 4100 is configured to be cast without an axially supported lifting bolt.

Figure 24B:
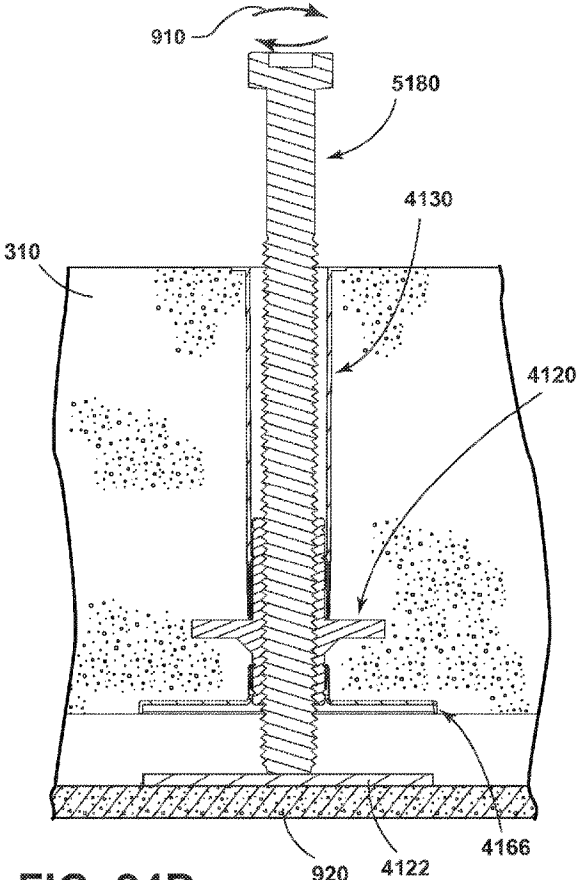
FIG. 24B is a sectional view of the lifting and leveling assembly of FIG. 23 embedded in a concrete slab in a leveling position.
Figure 24A:
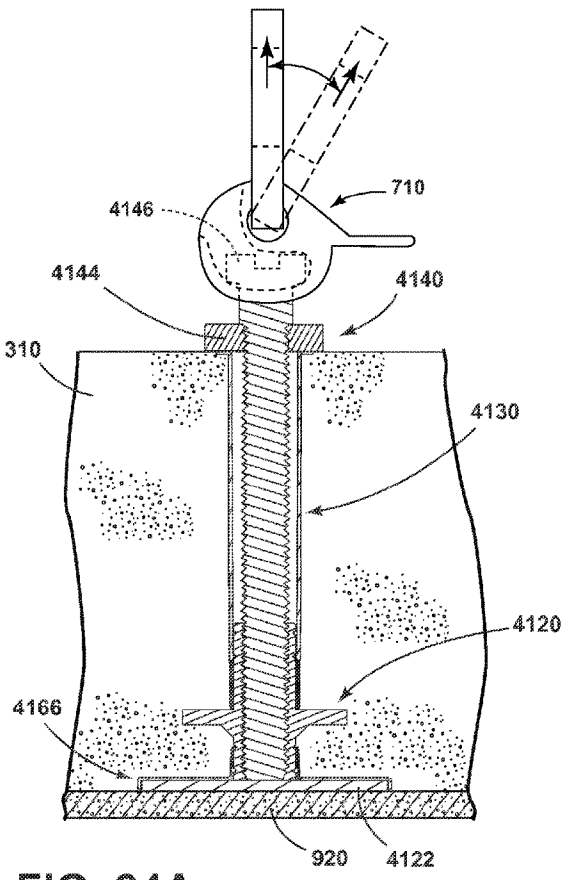
FIG. 24A is a sectional view of the lifting and leveling assembly of FIG. 23 embedded in a concrete slab in a lifting position.

To lift the precast concrete slab 310, the end cap 4150 may be removed and an axially supported lifting bolt 4140 may be inserted through the thread protecting sleeve 4130 and into the anchoring assembly 4120 until the lower surface of the threaded collar 4144 abuts the top surface of the precast concrete slab 310 as shown in FIG. 24A. With the hexogen socket head 4146 exposed, a conventional lifting eye 710 may be secured to the hexagon socket head 4146. The conventional lifting eye 710 may be any commercially available lifting eye similar in construction and operation to U.S. Pat. No. 4,703,595. A crane (not shown) may then attach to the lifting eye 710 using a rigging system (not shown) to lift the precast concrete slab 310. It will be understood that common precast concrete slabs are rectangular in shape and to lift properly, a lifting and leveling assembly 4100 may be disposed at each corner of the precast concrete slab 310 so as to properly distribute the load during lifting.

Once positioned in the excavation, the precast concrete slab 310 can be raised and leveled by inserting a lifting bolt 5180 through the thread protecting sleeve 4130 and into the anchoring assembly 4120. With the lifting bolt 5180 inserted, the precast concrete slab 310 can be raised and leveled as shown and described in FIG. 18.

Once the desired level is achieved, a suitable grout may be pumped beneath the precast concrete slab 310 from separate fill holes to fill and solidify the void between the excavation bed 920 and the precast concrete slab 310. Once the grout is cured, the lifting bolt 5180 may be removed and the void within the thread protecting sleeve 4130 and anchoring assembly 4120 can be filled with grout.

The lifting and leveling assembly according to this invention has the ability to improve user usability, reduce labor costs, increase efficiency and improve safety. The lifting and leveling assembly incorporates the lifting bolt and end cap with the rest of the assembly, reducing the possibility for missing parts needed for installation and use. This also allows the lifting and leveling assembly to be used to lift and level a precast concrete slab without the removal of the lifting bolt, saving significant time. Furthermore, the lifting bolt top of the lifting bolt is disposed beneath the surface of the concrete slab during leveling so that the lifting bolt does not present a tripping hazard and so that the lifting bolt does not need to be removed after grouting. The lifting and leveling assembly also has reusable reuse by removing the grout disposed above the threaded collar or end cap. The lifting bolt is designed to work with commercially available pivoting lifting eyes which enable fast installation in one fluid step. The lifting and leveling assembly has a system that requires only a simple rotation of a bolt using conventional tools to level or ready the slab for lifting. The outer housing surrounding the base plate prevents adhesion between the precast concrete slab and the base plate, which facilitates separation of the base plate from the precast concrete slab to aid in leveling. Furthermore, the outer housing and adjustable thread protecting sleeve allows the use of the same lifting and leveling assembly for precast concrete slabs of different heights by adjusting the height of the lifting and leveling device and supplying an axially supported lifting bolt having a corresponding height.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A lifting and leveling assembly configured to be embedded in a precast concrete slab and for lifting and leveling the same, the lifting and leveling assembly comprising:

an internally threaded sleeve;

a threaded lifting bolt threaded into the threaded sleeve and including a threaded shaft and a bolt head;

a hollow thread protecting sleeve disposed at least in part above the threaded sleeve and encompassing an upper portion of the threaded shaft;

a removable end cap selectively covering the bolt head;

a base plate configured for supporting relationship with the threaded sleeve; and an outer housing surrounding the threaded sleeve and base plate to releasably bind the two together, wherein the outer housing surrounds at least a portion of the threaded lifting bolt and the thread protecting sleeve is slidably received in an upper portion of the outer housing.

2. The lifting and leveling assembly of claim 1 and further comprising an anchor fixedly attached to the threaded sleeve and extending transversely thereof.

3. The lifting and leveling assembly of claim 2 wherein the anchor and threaded sleeve are integral.

4. The lifting and leveling assembly of claim 1 wherein the anchor comprises a plate that extends 360° around the threaded sleeve.

5. The lifting and leveling assembly of claim 4 wherein the anchor plate is rectangular.

6. The lifting and leveling assembly of claim 1 wherein the thread protecting sleeve is adjustably retained within the outer housing to adjust an overall height the lifting and leveling assembly defined by the height between the base plate and the top surface of the end cap.

7. The lifting and leveling assembly of claim 6 wherein the height of the thread protecting sleeve relative to the outer housing is adjustable and threaded lifting bolt corresponds to the overall height of the overall height the lifting and leveling assembly.

8. The lifting and leveling assembly of claim 7 wherein the outer housing includes a height adjustment track and the thread protecting sleeve includes a protrusion that rides in the height adjustment track, and the height adjustment track includes a plurality of locking recesses positioned along height adjustment track, the locking recesses configured to receive the protrusion to position and retain the thread protecting sleeve in the outer housing at predetermined heights.

9. The lifting and leveling assembly of claim 7 and further comprises a detent mechanism between the thread protecting sleeve and the outer housing for selectively adjusting the height of the thread protecting sleeve with respect to the outer housing.

10. The lifting and leveling assembly of claim 1 wherein the outer housing covers a top surface of the base plate to reduce adhesion between the base plate and the precast concrete slab.

11. The lifting and leveling assembly of claim 1 wherein the outer housing includes a base plate retainer configured to releasably retain the base plate within the outer housing.

12. The lifting and leveling assembly of claim 1 wherein the outer housing is formed from two identical halves which are configured to be joined together around the threaded sleeve and base plate.

13. The lifting and leveling assembly of claim 12 wherein the two identical halves are joined together along a vertical seam.

14. The lifting and leveling assembly of claim 1, further comprising an internally threaded collar threaded onto an upper portion of the threaded shaft and within the thread protecting sleeve.

15. The lifting and leveling assembly of claim 14 wherein the removable end cap has head engaging bosses to center the removable end cap on the bolt head and extend to the internally threaded collar.

16. A precast concrete slab with at least one lifting and leveling assembly according to claim 1 wherein the removable end cap has an upper surface that is flush with an upper surface of the precast concrete slab and the base plate has a lower surface that is flush with a lower surface of the precast concrete slab.

17. The lifting and leveling assembly of claim 1 and further comprising a hollow cylinder that is affixed to the base plate and slidably receives a lower portion of the internally threaded sleeve.

18. A precast concrete slab with at least one lifting and leveling assembly according to claim 17 embedded therein wherein and the base plate has a lower surface that is flush with a lower surface of the precast concrete slab.

19. The lifting and leveling assembly of claim 1 wherein the removable end cap has head engaging bosses to center the removable end cap on the bolt head.

*20. A lifting and leveling assembly configured to be embedded in a precast concrete slab and for lifting and leveling the same, the lifting and leveling assembly comprising:*

*an anchoring assembly including an internally threaded sleeve having an upper portion and lower portion;*

*a base plate configured for supporting relationship with the internally threaded sleeve;*

*a hollow thread protecting sleeve disposed at least in part above the internally threaded sleeve and mounted to the upper portion of the internally threaded sleeve; and*

*a base plate cover mounted to the lower portion of the internally threaded sleeve;*

*wherein the base plate cover is configured to selectively retain the base plate and to shield the base plate from concrete during casting of the concrete slab, and when the concrete slab is cast, is configured to detach from the base plate and remain with the concrete slab as rotation of a bolt in the internally threaded sleeve causes the anchoring assembly to move away from the base plate.*

*21. The lifting and leveling assembly of claim 19 wherein the hollow thread protecting sleeve is adjustably mounted to the upper portion of the internally threaded sleeve.*

*22. The lifting and leveling assembly of claim 20 wherein the hollow thread protecting sleeve has a lower hollow cylinder configured to flex radially.*

*23. The lifting and leveling assembly of claim 19 wherein the base plate cover has an upstanding cylinder configured to flex radially.*

*24. The lifting and leveling assembly of claim 19 wherein the hollow thread protecting sleeve and the base plate cover are formed from plastic.*

*25. The lifting and leveling assembly of claim 19 further comprising a removable end cap on the hollow thread protecting sleeve.*

*26. A lifting and leveling assembly configured to be embedded in a precast concrete slab and for lifting and leveling the same, the lifting and leveling assembly comprising:*

*an anchoring assembly including an internally threaded sleeve having an upper portion and lower portion;*

*a base plate configured for supporting relationship with the internally threaded sleeve;*

*a hollow thread protecting sleeve disposed at least in part above the internally threaded sleeve and mounted to the upper portion of the internally threaded sleeve; and*

*a base plate cover mounted to the lower portion of the internally threaded sleeve and configured to selectively retain the base plate and to shield the base plate from concrete during casting of the concrete slab,*

*wherein the hollow thread protecting sleeve has a lower hollow cylinder configured to flex radially.*

*27. A lifting and leveling assembly configured to be embedded in a precast concrete slab and for lifting and leveling the same, the lifting and leveling assembly comprising:*

*an anchoring assembly including an internally threaded sleeve having an upper portion and lower portion;*

*a base plate configured for supporting relationship with the internally threaded sleeve;*

*a hollow thread protecting sleeve disposed at least in part above the internally threaded sleeve and mounted to the upper portion of the internally threaded sleeve; and*

*a base plate cover mounted to the lower portion of the internally threaded sleeve and configured to selectively retain the base plate and to shield the base plate from concrete during casting of the concrete slab,*

*wherein the base plate cover has an upstanding cylinder configured to flex radially.*

* * * * *